(12) United States Patent
Uezono et al.

(10) Patent No.: US 12,505,020 B2
(45) Date of Patent: Dec. 23, 2025

(54) INFORMATION PROCESSING DEVICE AND INFORMATION PROCESSING METHOD USING ACCELERATOR DEVICE

(71) Applicant: HITACHI, LTD., Tokyo (JP)

(72) Inventors: Takumi Uezono, Tokyo (JP); Hiroaki Itsuji, Tokyo (JP); Kenichi Shimbo, Tokyo (JP); Masayoshi Takahashi, Tokyo (JP); Yutaka Uematsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 63 days.

(21) Appl. No.: 18/293,901

(22) PCT Filed: Sep. 26, 2022

(86) PCT No.: PCT/JP2022/035741
§ 371 (c)(1),
(2) Date: Jan. 31, 2024

(87) PCT Pub. No.: WO2023/119774
PCT Pub. Date: Jun. 29, 2023

(65) Prior Publication Data
US 2024/0338286 A1 Oct. 10, 2024

(30) Foreign Application Priority Data
Dec. 20, 2021 (JP) .................. 2021-205929

(51) Int. Cl.
*G06F 11/20* (2006.01)
*G06F 11/16* (2006.01)

(52) U.S. Cl.
CPC ........ *G06F 11/2041* (2013.01); *G06F 11/165* (2013.01); *G06F 11/2028* (2013.01)

(58) Field of Classification Search
CPC ............. G06F 11/1608; G06F 11/1629; G06F 11/165; G06F 11/2028; G06F 11/2041; G06F 9/40
See application file for complete search history.

(56) References Cited

U.S. PATENT DOCUMENTS 5,655,069 A 8/1997 Ogawara et al.
10,216,555 B2 * 2/2019 Chiou ................. G06F 11/0709
(Continued)

FOREIGN PATENT DOCUMENTS

JP 08-44581 A 2/1996

OTHER PUBLICATIONS

International Search Report of PCT/JP2022/035741 dated Dec. 27, 2022.

*Primary Examiner* — Gabriel Chu
(74) *Attorney, Agent, or Firm* — MATTINGLY & MALUR, PC

(57) ABSTRACT

An arithmetic operation target is input to an information processing apparatus which causes an accelerator apparatus to perform an arithmetic operation using the arithmetic operation target. The information processing apparatus performs, regarding each of a plurality of arithmetic operation elements of the arithmetic operation target, whether to allocate one or more diagnostic circuits, which are available processing circuits for an accuracy diagnosis of the arithmetic operation from a plurality of processing circuits in the accelerator apparatus to the arithmetic operation element on the basis of a failure influence degree. The reliability of the information processing apparatus that is used to judge whether or not to continue an action(s) of the information processing apparatus is calculated on the basis of the number of arithmetic operation elements of the arithmetic operation target, the number of arithmetic operation elements to which (Continued)

at least one diagnostic circuit is allocated, and the failure influence degree.

12 Claims, 7 Drawing Sheets

(56) References Cited

U.S. PATENT DOCUMENTS

| | | | |
|---|---|---|---|
| 10,270,709 B2* | 4/2019 | Burger | H04L 47/781 |
| 2007/0074011 A1* | 3/2007 | Borkar | G06F 1/324 |
| | | | 712/227 |
| 2008/0163255 A1* | 7/2008 | Munoz | G06F 11/2028 |
| | | | 719/318 |
| 2009/0094481 A1* | 4/2009 | Vera | G06F 11/202 |
| | | | 714/11 |
| 2014/0025991 A1* | 1/2014 | Anandavally | G06F 11/079 |
| | | | 714/E11.061 |
| 2016/0306700 A1* | 10/2016 | Heil | G06F 11/0793 |
| 2018/0285314 A1* | 10/2018 | Higeta | G06F 9/30032 |
| 2019/0018744 A1* | 1/2019 | Alexander | G06F 11/2043 |

\* cited by examiner

INFORMATION PROCESSING DEVICE AND INFORMATION PROCESSING METHOD USING ACCELERATOR DEVICE

TECHNICAL FIELD

The present invention generally relates to an information processing technology including arithmetic operations by an accelerator apparatus.

BACKGROUND ART

A market for machine learning or deep learning is formed, utilization of AI (Artificial Intelligence) in edge device such as automatic driving and industrial infrastructure apparatuses is underway, and the use of hardware accelerators such as GPU (Graphics Processing Units) and exclusive LSI (Large Scale Integration) is progressing.

With these edge devices, there is a possibility that an anomaly/anomalies of hardware may occur due to influences of the environment and secular changes. For stable action continuation of a system, not only anomaly detection of the hardware, but also a recovery technology are indispensable.

For example, the following are known as recovery methods:
- (*) to restart the system;
- (*) if an anomaly has occurred at a main system (an active system), to switch from the main system to a standby system; and
- (*) to perform a degeneracy action that is an action excluding the part where the anomaly has occurred.

Furthermore, PTL 1 discloses an information processing apparatus with a self-repair function.

CITATION LIST

Patent Literature

PTL 1: Japanese Patent Application Laid-Open (Kokai) Publication No. H8-44581

SUMMARY OF THE INVENTION

Problems to be Solved by the Invention

In recent years, balancing reliability and action continuity has been required for the edge device. Also, the edge device is one example of information processing apparatuses. Balancing the reliability and the action continuity can be also required for information processing apparatuses other than the edge device.

There is an information processing apparatus equipped with an accelerator apparatus. The accelerator apparatus executes specified kinds of arithmetic operations in information processing. Accordingly, an increase in speed of the processing can be expected. As the specified kinds of the arithmetic operations, for example, there is an arithmetic operation using a machine learning model. As the machine learning model, there is a machine learning mode with a graph structure (a machine learning mode having a plurality of nodes and a plurality of edges for connecting the respective nodes). As the machine learning model with the graph structure, for example, there is a neural network; however, a graph structure model such as a decision tree may be adopted instead of the neural network.

The accelerator apparatus has one or more hardware accelerators. The hardware accelerator has a plurality of processing circuits. As a diagnosis for detecting a failure of the processing circuit in the accelerator apparatus, the plurality of processing circuits may possibly perform arithmetic operations of the same arithmetic operation element in an arithmetic operation target and compare the arithmetic operation results of the plurality of processing circuits. For example, the "arithmetic operation target" may be a machine learning model with the graph structure and the "arithmetic operation element" may be a node in the machine learning model with the graph structure. By inputting information to the "arithmetic operation target," the information passes through at least some arithmetic operation elements among a plurality of arithmetic operation elements (arithmetic operations are performed by using the information) and then the information is output from the "arithmetic operation target."

If a failure is detected in the processing circuit of the accelerator apparatus, actions can be continued by the aforementioned conventional recovery method, but there is a possibility that the reliability may degrade after the occurrence of the failure.

For example, at each node in the machine learning model with the graph structure, there may be an accelerator apparatus to which a processing circuit as a main system and a processing circuit as a standby system are allocated. If a failure occurs in the main system of this accelerator apparatus, the main system is switched to the standby system and then the actions are continued. However, in this case, if a failure occurs in the standby system which is a switching destination, there will be no next switching destination and, therefore, the reliability will degrade. Also, two systems, that is, the main system and the standby system need to be maintained at each node, so that the accelerator apparatus may become large-sized and may not be able to satisfy required specifications of the information processing apparatus (for example, edge device).

The above-described problem can happen also when the specified kinds of arithmetic operations are arithmetic operations other than the arithmetic operations using the machine learning model with the graph structure.

It is an object of the present invention to balance the reliability and the action continuity of the information processing apparatus so that the accelerator apparatus will not become large-sized.

Means to Solve the Problems

An information processing apparatus for causing an accelerator apparatus to perform an arithmetic operation by using an arithmetic operation target which is used for the arithmetic operation of input information and which outputs information comprises an allocation decision unit and a reliability judgment unit. Every time the information for which the arithmetic operation target is used is input, the following are performed:

the allocation decision unit decides, regarding each of a plurality of arithmetic operation elements of the arithmetic operation target, whether to allocate one or more diagnostic circuits, which are available processing circuits for an accuracy diagnosis of the arithmetic operation, other than an arithmetic circuit which is an available processing circuit for the arithmetic operation, from the plurality of processing circuits in the accelerator apparatus to the arithmetic operation element on the basis of a failure influence degree that is a degree of influence by accuracy of an arithmetic operation result of the arithmetic operation element on accuracy of output information of the arithmetic operation target; and the reliability judgment unit calculates reliability of the information processing apparatus that is used to judge whether or not to continue an action(s) of the information processing apparatus, on the basis of the number of arithmetic operation elements in the arithmetic operation target, the number of arithmetic operation elements to which at least one diagnostic circuit is allocated, and the failure influence degree of the arithmetic operation elements.

Advantageous Effects of the Invention

According to the present invention, the reliability and the action continuity of the information processing apparatus can be balanced so that the accelerator apparatus will not become large-sized.

DESCRIPTION OF EMBODIMENTS

Figure 1:
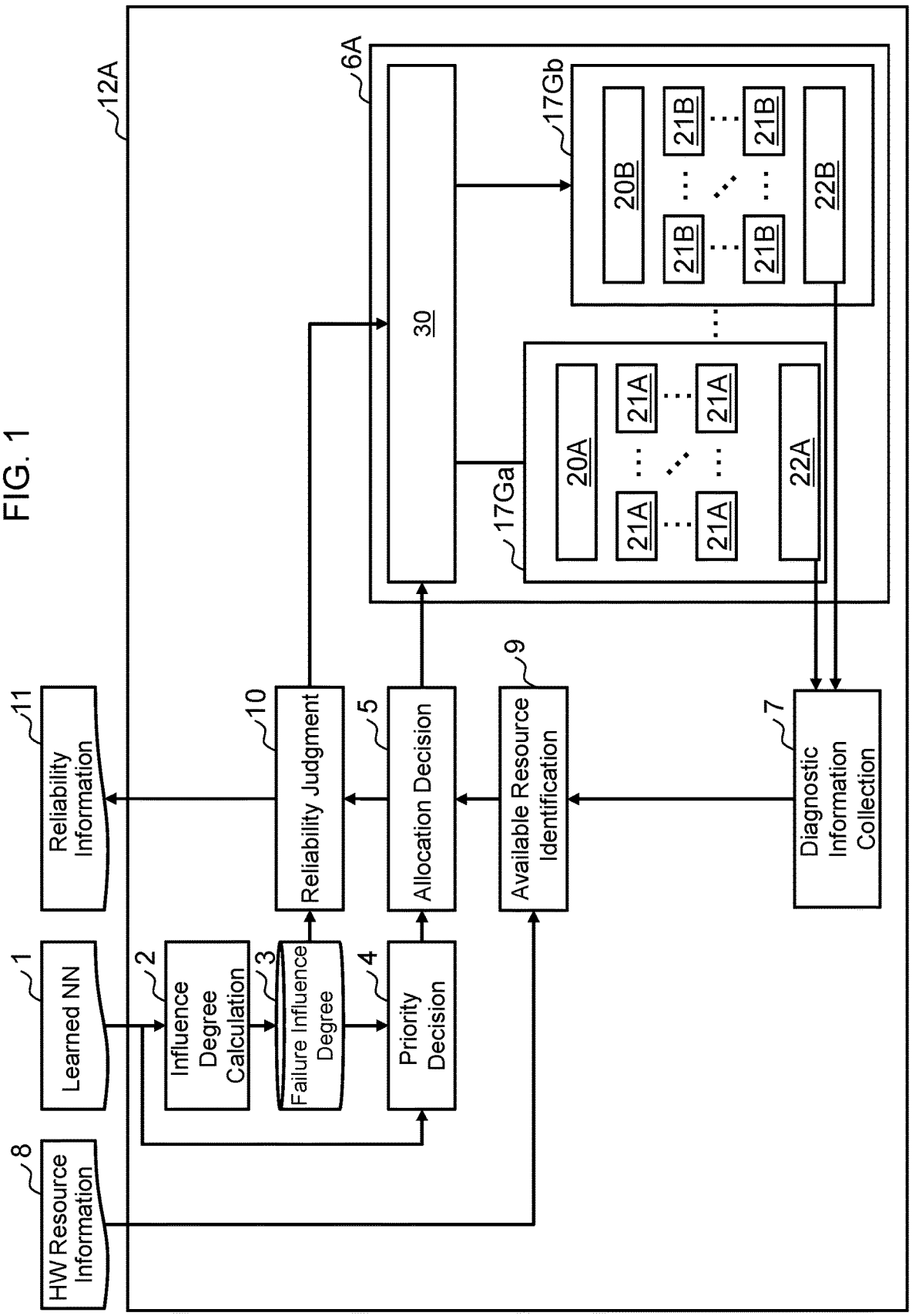
FIG. 1 is a configuration diagram of an information processing apparatus according to a first embodiment.

In the description indicated below, an "interface apparatus" may be one or more interface devices. The one or more interface devices may be at least one of the following:

One or more I/O (Input/Output) interface devices. The I/O (Input/Output) interface device is an interface device for at least one of an I/O device and a remote display computer. The I/O interface device for the display computer may be a communication interface device. At least one I/O device may be a user interface device, for example, either input devices such as a keyboard and a pointing device or output devices such as a display device.

One or more communication interface devices. The one or more communication interface devices may be one or more communication interface devices of the same type (for example, one or more NICs [Network Interface Cards]) or two or more communication interface devices of different types (for example, an NIC and an HBA [Host Bus Adapter]).

Furthermore, in the description indicated below, a "memory" is one or more memory devices, which are an example of one or more storage devices, and may typically be a main storage device. At least one memory device in the memory may be a volatile memory device or a nonvolatile memory device.

Furthermore, in the description indicated below, a "persistent storage apparatus" is one or more persistent storage devices which are an example of one or more storage devices. The persistent storage device may typically be a nonvolatile storage device (such as an auxiliary storage device) and may specifically be, for example, an HDD (Hard Disk Drive), an SSD (Solid State Drive), or an SCM (Storage Class Memory).

Furthermore, in the description indicated below, a "storage apparatus" may be a memory and at least a memory for the persistent storage apparatus.

Furthermore, in the description indicated below, a "processor" may be one or more processor devices. At least one processor device may typically be a microprocessor device like a CPU (Central Processing Unit). At least one processor device may be a single-core processor device or a multi-core processor device.

Furthermore, in the description indicated below, a function may be sometimes described by an expression like "yyy unit"; however, the function may be implemented by execution of one or more computer programs by a processor, or may be implemented by one or more hardware circuits (such as FPGA or ASIC), or may be implemented by a combination of the above. If the function is implemented by the execution of a program by the processor, specified processing is performed by using, for example, storage apparatuses and/or interface apparatuses as appropriate and, therefore, the function may be considered as at least part of the processor. The processing explained by referring to the function as a subject may be the processing executed by the processor or an apparatus which has that processor. The program may be installed from a program source. The program source may be, for example, a program distribution computer or a computer-readable recording medium (such as a non-transitory recording medium). An explanation of each function is one example, and a plurality of functions may be gathered as one function or one function may be divided into a plurality of functions.

Embodiments of the present invention will be described below with reference to the drawings.

First Embodiment

Figure 2:
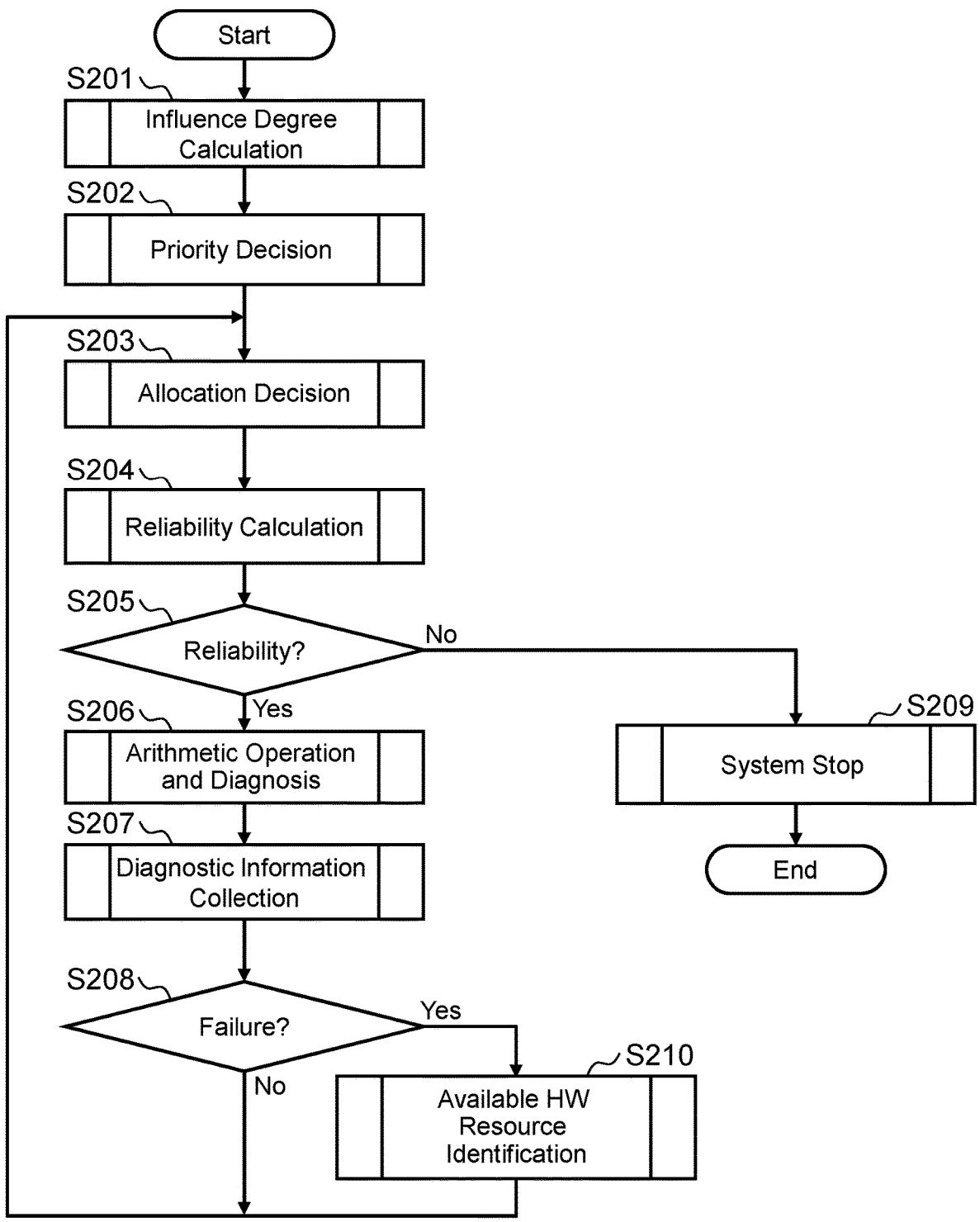
FIG. 2 is an action flowchart of the information processing apparatus according to the first embodiment.

FIG. 1 is a diagram illustrating a configuration example of an information processing apparatus according to a first embodiment. Moreover, FIG. 2 is an action flowchart of the information processing apparatus.

An information processing apparatus 12A has an influence degree calculation unit 2, a priority decision unit 4, an allocation decision unit 5, an accelerator apparatus 6A, a diagnostic information collection unit 7, an available resource identification unit 9, and a reliability judgment unit 10. The accelerator apparatus 6A has a plurality of GPUs (Graphics Processing Units) 17G, a controller 30 for controlling the plurality of GPUs 17G, and a memory 22 for storing arithmetic operation results of each core 21. The GPU 17G is an example of a hardware accelerator and, specifically, is an example of a parallel processing device. The GPU 17G has a plurality of cores (GPU cores) 21.

The influence degree calculation unit 2 performs an influence degree calculation (S201). Specifically, when a failure occurs at each node and an arithmetic operations fails, the influence degree calculation unit 2 quantitatively analyzes whether or not any influence of the failure will affect an output regarding a learned neural network 1 (data indicating a neural network). A possible analysis method is error injection to examine whether any influence exists or not by comparing simulation results, which are obtained by assuming the failure regarding each node, with simulation results in normal times. As a method for quantifying the influence degree, for example, an AVF (Architectural Vulnerability Factor) is utilized. The AVF is defined by a rate of the influence of the failure to become an error of an arithmetic operation result of the neural network with respect to all failure modes which occur at the nodes. Information as a result of the analysis by the influence degree calculation unit 2 is output as a failure influence degree 3. The failure influence degree 3 includes information indicating an influence degree of each node in the learned neural network 1.

The priority decision unit 4 makes a priority decision (S202). Specifically, the priority decision unit 4 sets a diagnostic priority to each node within the learned neural network 1 by using the failure influence degree 3. A possible method for defining the diagnostic priority may be to rank the nodes in descending order of the failure influence degree and set such ranks as priorities or to create two or more node groups by using the size of the failure influence degree and set the priorities to the node groups.

The allocation decision unit 5 makes a function allocation decision (S203). Specifically, when information acquired from the available resource identification unit 9 indicates one or more available hardware resources (cores 21 in this embodiment), the allocation decision unit 5 allocates an arithmetic operation function performing arithmetic operations regarding a specified node within the neural network or a diagnostic function performing a diagnosis regarding a specified node within the neural network to at least one available core 2. Since the available cores 21 are limited, the allocation decision unit 5 firstly allocates the arithmetic operation function and then allocates the diagnostic function to the remaining cores 21. When allocating the diagnostic function to the remaining cores 21, the allocation decision unit 5 allocates the diagnostic function to the nodes in descending order of diagnostic priority and terminates the allocation when there is no more available core 21. The allocation decision unit 5 sends information of a diagnostic node (a node regarding which the arithmetic operation result is diagnosed) as diagnostic node information to the reliability judgment unit 10. The diagnostic node information may include, for example, an ID list of diagnostic nodes. Moreover, the allocation decision unit 5 allocates an NOP (No Operation) to an unavailable core(s) 21 (hardware resource (s)) indicated by information acquired from the available resource identification unit 9 so as not to cause it/them to perform any valid arithmetic operation(s). For example, the allocation decision unit 5 allocates, for example, arithmetic operations for nodes 1 to 10 as GPUs 17Ga and allocates arithmetic operations for nodes 11 to 20 as GPUs 17Gb. Allocation result information indicating the allocation result includes at least information indicating a GPU 17G to be executed (for example, a unique GPU number) and arithmetic operation information to be executed by that GPU 17G (for example, operands and usage data). Specifically speaking, the allocation result information includes information indicating the GPUs 17G which are the respective allocation destinations of the arithmetic operation function and the diagnostic function regarding the nodes. Whether the arithmetic operation function or the diagnostic function is allocated to which node may be specified in the allocation result information or may be decided by the controller 30 for the accelerator apparatus 6A on the basis of the allocation result information. The allocation decision unit 5 sends the allocation result information to the accelerator apparatus 6.

The reliability judgment unit 10 performs a reliability calculation (S204). Specifically, the reliability judgment unit 10 quantitatively derives reliability of the information processing apparatus 12A by using the diagnostic node information and the failure influence degree 3. The reliability judgment unit 10 judges whether the derived reliability satisfies reliability or not (that is, whether to continue the action or not) (S205).

A possible quantitative index of the reliability of the system (the information processing apparatus 12A) may be, for example, a diagnostic coverage rate. The diagnostic coverage rate C can be calculated according to the following mathematical expression.

$$C = \frac{\sum_{a \in N} AVF_a}{AVF_{all}} \quad \text{[Math. 1]}$$

Here, N represents a set of diagnosis target nodes, $AVF_a$ is a quantitative influence degree regarding a diagnosis target node a, and $AVF_{all}$ represents the sum of AVFs of all the nodes included in the neural network. The diagnostic coverage rate C depends on the height of the failure influence degree of the nodes where core multiplexing is maintained (the nodes to which diagnostic cores are allocated other than an arithmetic operation core described later) and the number of the nodes where the multiplexing is maintained. For example, even if the number of the nodes where the core multiplexing is maintained decreases, if the failure influence degree of such nodes is small, a reduction of the diagnostic coverage rate will be small. In other words, if the number of the cores where the core multiplexing is maintained decreases and the failure influence degree of such nodes is large, the reduction of the diagnostic coverage rate will be large.

The reliability judgment unit 10 sends reliability information 11, which is information indicating the derived reliability, outside (for example, it displays the reliability information 11 on a display device or sends the reliability information 11 to a host computer system which uses the reliability information 11 for the purpose of, for example, monitoring). Moreover, if the derived system reliability is less than a constant value (S205: No), the reliability judgment unit 10 judges that it is not safe, so it stops the arithmetic operation of the accelerator apparatus 6 and performs a system stop (to stop the action continuation of the information processing apparatus 12A) (S209). Instead of the system stop, the reliability judgment unit 10 may notify the outside (for example, a user or an external computer system) of the decision of the system stop.

If the reliability is equal to or more than a constant value (S205: Yes), an arithmetic operation and a diagnosis are executed (S206). Specifically speaking, the controller 30 for the accelerator apparatus 6A identifies a GPU 17G to execute an arithmetic operation(s) based on the allocation result information from the allocation decision unit 5, decides arithmetic operation control information (for example, operands and data) with regard to the identified GPU 17G, and sends the decided arithmetic operation control information to that GPU 17G. The GPU 17G executes the arithmetic operation and the diagnosis based on the arithmetic operation control information. For example, regarding one node, there are an arithmetic operation core (for example, a main system) that is a core 21 to which the arithmetic operation function is allocated, and two or more diagnostic cores (for example, redundant systems) that are two or more cores 21 to which the diagnostic function is allocated respectively. The arithmetic operation core and the two or more diagnostic cores perform the same arithmetic operation and their respective arithmetic operation results are stored in the memory 22.

The diagnostic information collection unit 7 collects diagnostic information from the GPUs 17G to which the diagnostic function is allocated (S207). The diagnostic information may include the respective arithmetic operation results of the arithmetic operation core and the two or more diagnostic cores regarding the same node and also include information indicating a comparison result of these arithmetic operation results (for example, cores which output different arithmetic operation results). The collection may be performed through a path linked between the GPUs 17G (the path for directly sending the diagnostic information to the diagnostic information collection unit 7) or may be performed by a method of causing the diagnostic information collection unit 7 to read the diagnostic information stored in the memory 22. The diagnostic information collection unit 7 identifies a failed core which is a core where a failure has occurred, from the collected diagnostic information and sends failed core information indicating the failed core to the available resource identification unit 9.

The available resource identification unit 9 judges whether any failed core exists or not (S208). For example, the available resource identification unit 9 judges whether or not it has received the failed core information indicating the existence of the failed core from the diagnostic information collection unit 7.

If the judgment result of S208 is false (S208: No), the processing returns to S203.

If the judgment result of S208 is true (S208: Yes), the available resource identification unit 9 identifies an available core(s) (hardware resource(s)) (S210). Specifically, the available resource identification unit 9 refers to hardware resource information 8. The hardware resource information 8 is, for example, information which is input from outside, and includes information indicating all the cores in the accelerator apparatus 6A (for example, information indicating which core 21 exists in which GPU 17G). The available resource identification unit 9 identifies a core(s) other than the failed core indicated by the failed core information (that is, a core(s) where no failure has occurred), among the cores indicated by the hardware resource information 8, as an available core(s) and sends information indicating the available core(s) to the allocation decision unit 5. Then, S203 is performed.

Information is input to the learned neural network 1 as appropriate. Every time the information is input to the learned neural network 1, S203 and subsequent steps are performed.

Even if a failure occurs in a core during the processing of the learned neural network 1, it is possible according to this embodiment to minimize the degradation of the system reliability based on the failure influence degree of each node as calculated based on the learned neural network 1 and realize the action continuation of the information processing apparatus 12A highly reliably.

Second Embodiment

A second embodiment will be explained. When doing so, the explanation will be mainly focused on the difference from the first embodiment and an explanation about common points with the first embodiment will be omitted or simplified.

In this embodiment, a neural-network arithmetic operation is performed by using a plurality of kinds of hardware accelerators.

Figure 3:
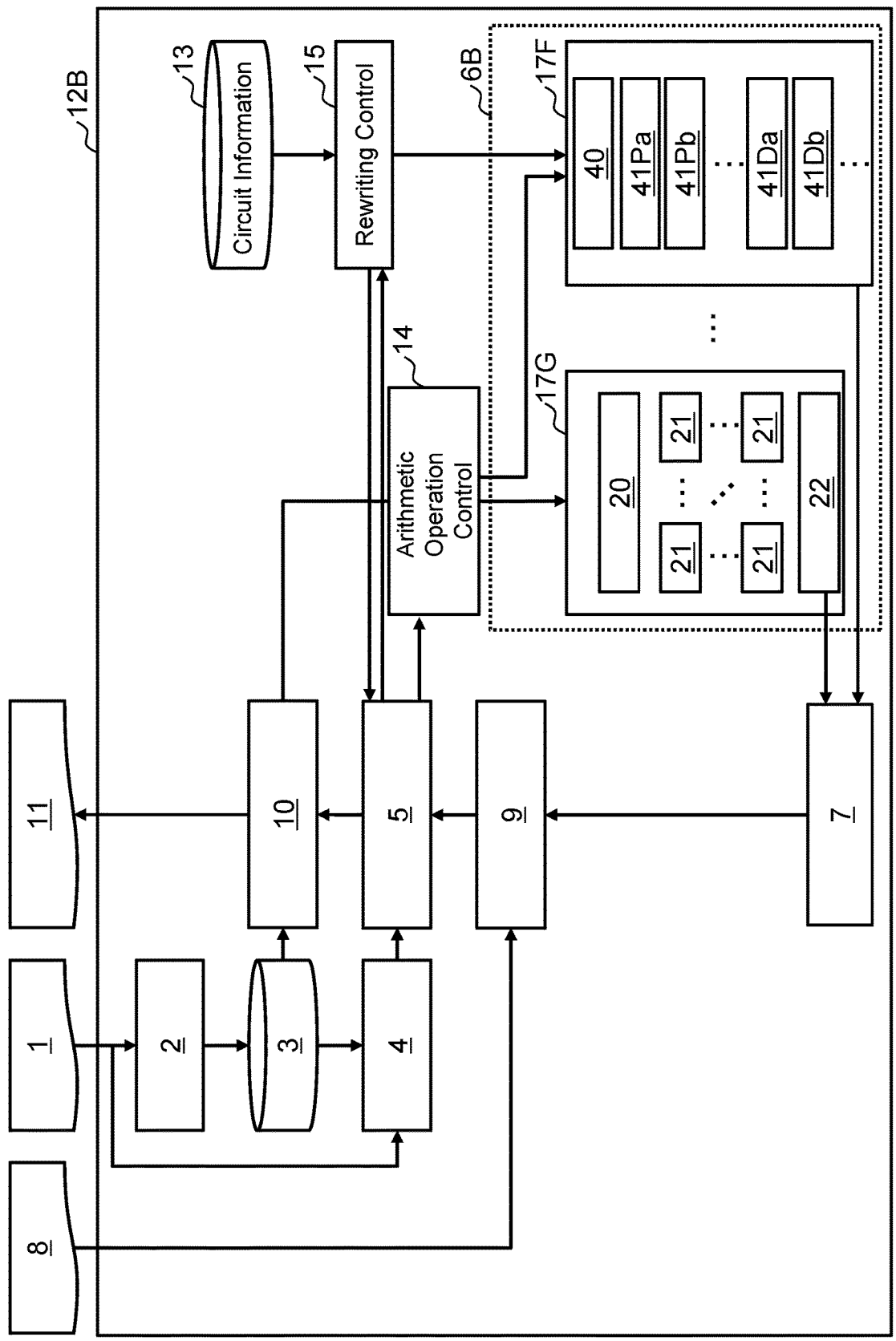
FIG. 3 is a configuration diagram of an information processing apparatus according to a second embodiment.
Figure 4:
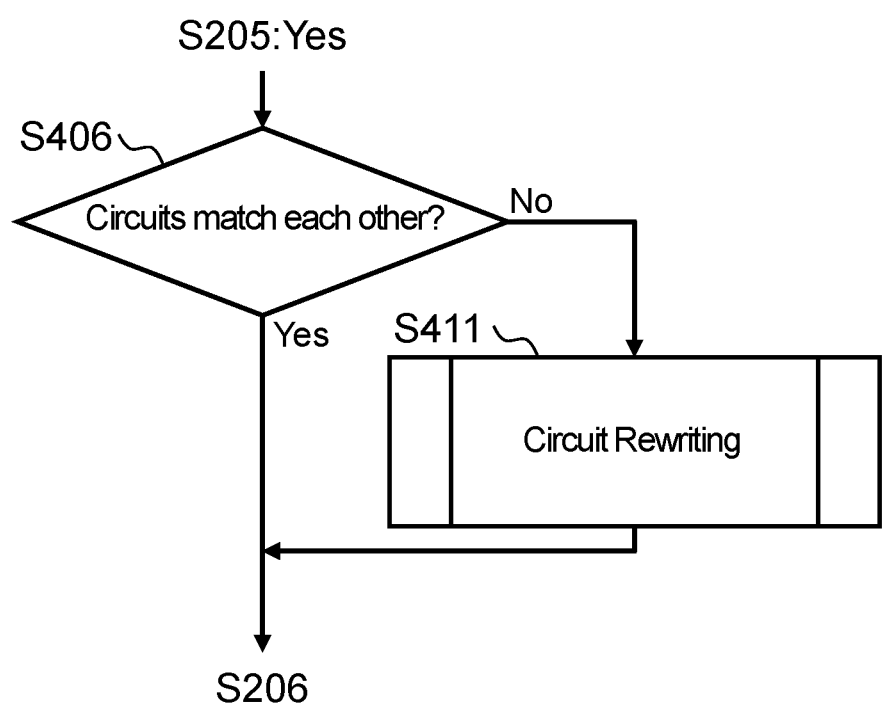
FIG. 4 is an action flowchart of the information processing apparatus according to the second embodiment.

FIG. 3 is a diagram illustrating a configuration example of an information processing apparatus according to the second embodiment. Moreover, FIG. 4 is an action flowchart of the information processing apparatus.

An information processing apparatus 12B has an accelerator apparatus 6B instead of the accelerator apparatus 6A. The accelerator apparatus 6B has a plurality of kinds of hardware accelerators 17. Specifically, the accelerator apparatus 6B has an FPGA (Field-Programmable Gate Array) 17F other than the GPUs 17G. The FPGA 17 has a circuit rewriting unit 40 and a plurality of processing circuits 41. As the processing circuits 41, there are arithmetic circuits 41P that are processing circuits to which the arithmetic operation function is allocated, and diagnostic circuits 41D that are processing circuits to which the diagnostic function is allocated. Instead of the FPGA 17F, another type of function rewritable device may be included as a hardware accelerator 17 or an ASIC (Application Specific Integrated Circuit) may be included as a hardware accelerator 17.

The information processing apparatus 12B has an arithmetic operation control unit 14 and a rewriting control unit 15.

Circuit information 13 indicating a circuit to be written to the FPGA 17F is input to and stored in the information processing apparatus 12B. The rewriting control unit 15 inputs the circuit information 13 to the circuit rewriting unit 40 of the FPGA 17 and the circuit rewriting unit 40 is designed to construct, in the FPGA 17, a circuit indicated by the input circuit information 13. The circuit information 13 may include information indicating whether the relevant processing circuit 41 is an arithmetic circuit 41P or a diagnostic circuit 41D, with respect to each processing circuit 41. Moreover, the rewriting control unit 15 is designed to input the circuit information 13, which indicates the circuit to be written to the FPGA 17F, to the allocation decision unit 5. Consequently, the rewriting control unit 15 can recognize a circuit configuration written in the FPGA 17F.

After YES in S205, the allocation decision unit 5 judges whether or not the circuit after the allocation in S203 (for example, whether the relevant processing circuit 41 is an arithmetic circuit 41P or a diagnostic circuit 41D, with respect to each processing circuit 41) matches the latest circuit of the FPGA 17F (for example, a circuit indicated by the input circuit information 13) (S406).

If the judgment result of S406 is true (S406: Yes), S206 and subsequent steps in FIG. 2 are performed. Specifically speaking, the allocation decision unit 5 sends the allocation result information to the arithmetic operation control unit 14. The arithmetic operation control unit 14 identifies a hardware accelerator 17 to execute an arithmetic operation based on the allocation result information from the allocation decision unit 5, decides arithmetic operation control information (for example, operands and data) with respect to the identified hardware accelerator 17, and sends the decided arithmetic operation control information to the relevant hardware accelerator 17. The hardware accelerator 17 executes the arithmetic operation and diagnosis on the basis of the arithmetic operation control information. For example, regarding one node, there are: an arithmetic operation core or an arithmetic circuit 41P as a processing circuit to which the arithmetic operation function is allocated; and two or more diagnostic cores or two or more diagnostic circuits 41D as two or more processing circuits to which the diagnostic function is allocated respectively. Accordingly, the arithmetic operation control unit 14 is designed to perform the processing similar to that of the controller 30.

If the judgment result of S406 is false (S406: No), circuit rewriting is performed (S411). Specifically speaking, the allocation decision unit 5 sends circuit change information (for example, a processing circuit whose allocation has been changed, and the allocation after the change) according to the allocation result to the rewriting control unit 15. The rewriting control unit 15 reads the circuit information 13, applies the input circuit change information to the read circuit information 13, and inputs circuit information indicating a circuit after the allocation decision to the circuit rewriting unit 40 for the FPGA 17F. When rewriting according to this circuit information is completed, the rewriting control unit 15 sends the circuit information, which is input to the FPGA 17, to the allocation decision unit 5. The allocation decision unit 5 retains that circuit information. The circuit information 13 may be overwritten with this circuit information 13. After S411, the processing in and after S206 is performed.

According to this embodiment, even with the information processing apparatus 12B having a plurality of kinds of hardware accelerators 17, the degradation of the system reliability can be minimized and the action continuation of the information processing apparatus 12B can be realized highly reliably. Moreover, by using the plurality of kinds of hardware accelerators 17, a common cause failure(s) can be excluded (for example, even if a failure cause which is common with the hardware accelerators of either the GPU 17G or the FPGA 17F, the other hardware accelerator can be expected to continue the action), so that much higher reliability can be expected.

Incidentally, the circuit rewriting in S411 may be the circuit rewriting of the entire FPGA 17; however, in this embodiment, partial rewriting (specifically, for example, rewriting of a circuit part including a processing circuit whose function allocation is changed) may be performed. A function that rewrites part of the FPGA 1F is called partial reconfiguration and is a function provided by an FPGA vendor.

Specifically speaking, if a GPU 17G is used, the function allocated to a core can be changed by a program and, therefore, switching time is short. On the other hand, if the FPGA 17F is used, rewriting of a mounted circuit is required to change the function to be allocated to the processing circuit and the switching time is longer than that of the GPU 17G. Incidentally, it is possible to mount a general-purpose circuit in the FPGA 17F and use it in a manner similar to the GPU 17G, but that would not take advantage of the FPGA 17F that is to be capable of implementing desired performance by configuring a circuit specialized in an application.

So, in this embodiment, the rewriting control unit 15 identifies a place which needs to be rewritten with respect to the FPGA 17F and rewrites only the minimum necessary place, thereby minimizing rewriting time. Particularly, regarding arithmetic operations of the neural network, there is a characteristic that only input data (for example, images captured by a camera) are different, but the same arithmetic operation is performed every cycle. Therefore, the number of arithmetic circuits basically does not change.

Consequently, it is possible to reduce the rewriting time of the FPGA 17F and reduce time to recover the FPGA 17F after the occurrence of the failure.

Third Embodiment

A third embodiment will be explained. When doing so, the explanation will be mainly focused on the differences from the first and second embodiments and an explanation about common points with the first and second embodiments will be omitted or simplified.

In this embodiment, a neural-network arithmetic operation is performed by using an FPGA(s) 17F.

Figure 5:
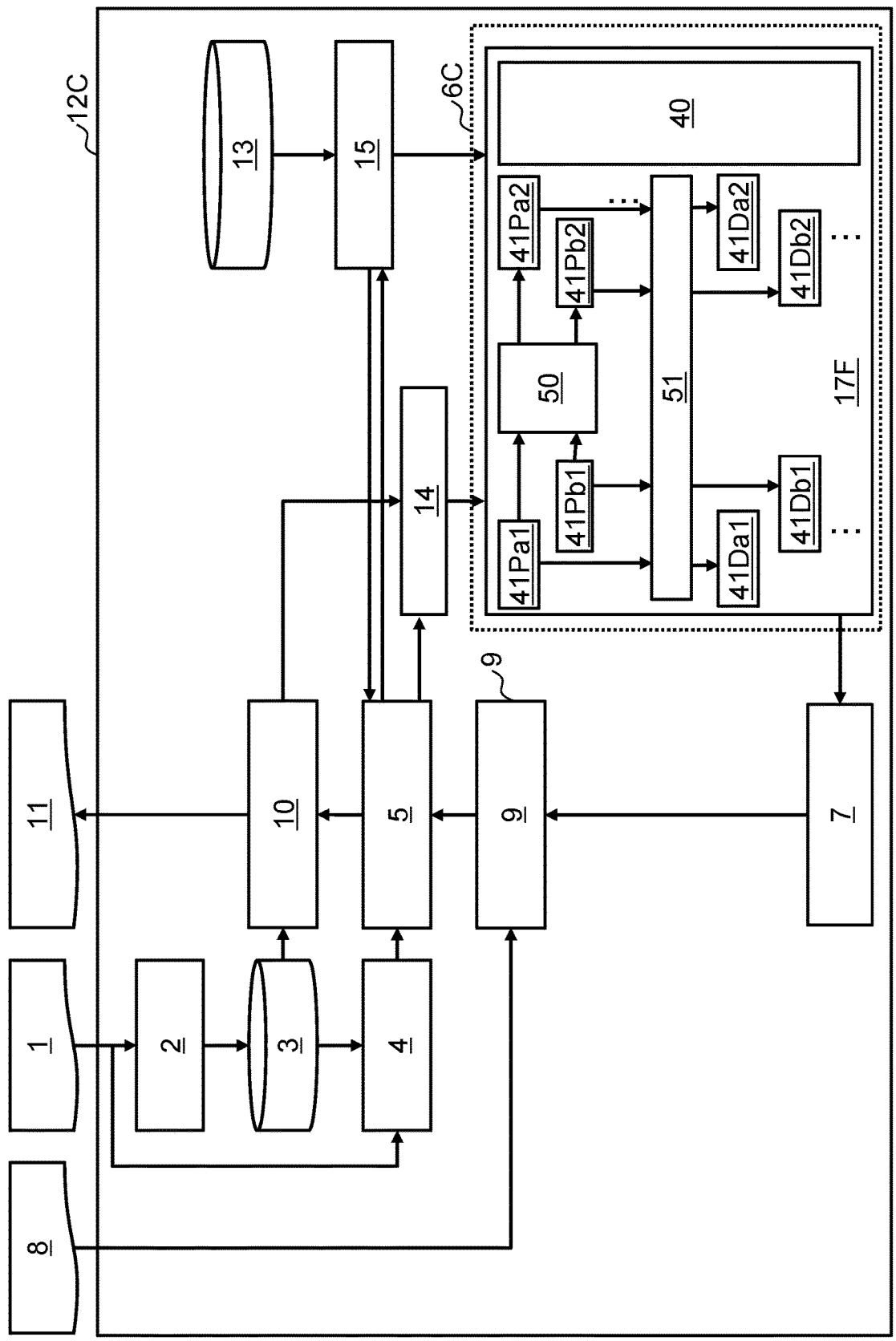
FIG. 5 is a configuration diagram of an information processing apparatus according to a third embodiment.
Figure 6:
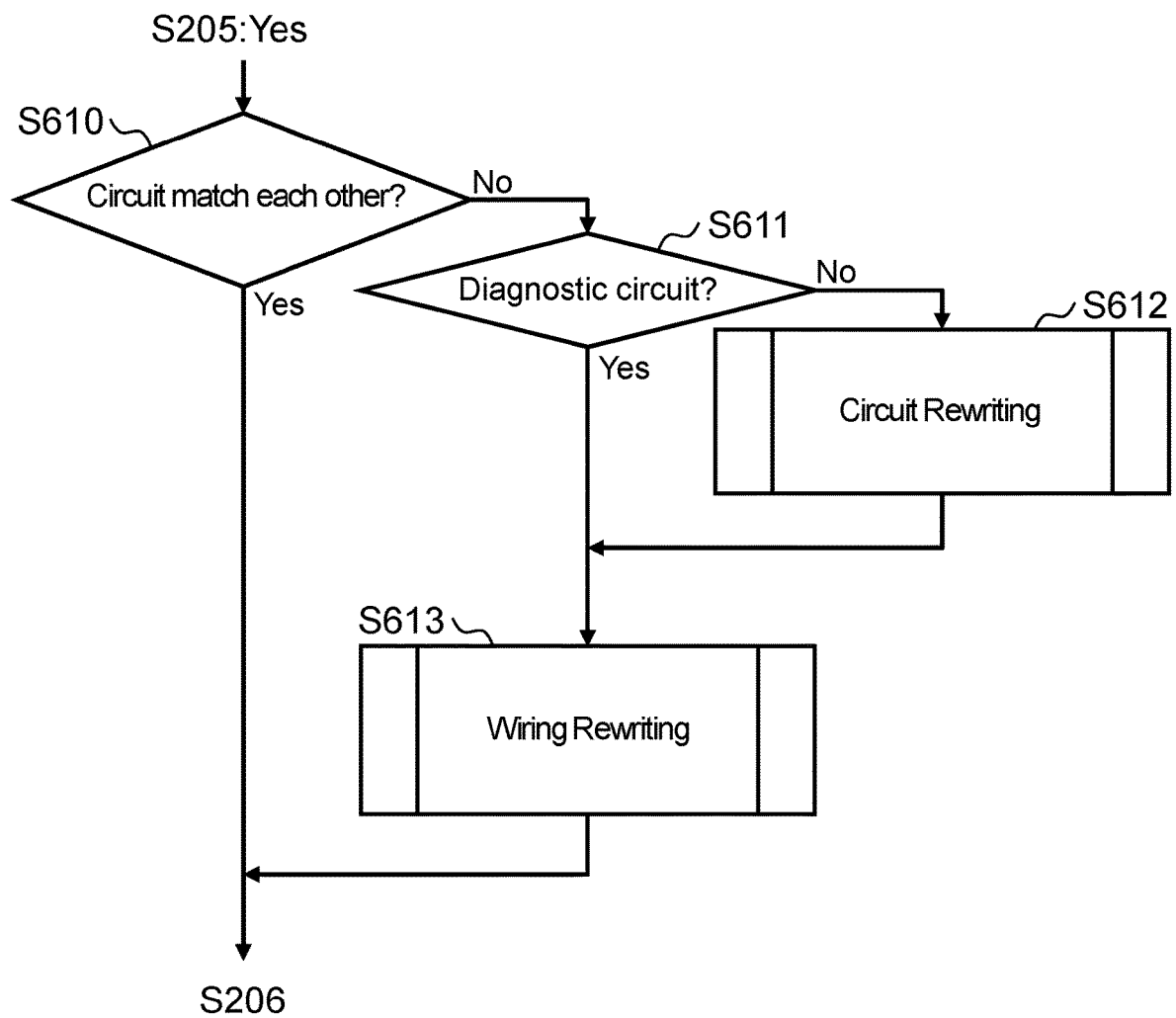
FIG. 6 is a configuration diagram of the information processing apparatus according to the third embodiment.

FIG. 5 is a diagram illustrating a configuration example of an information processing apparatus according to the third embodiment. Moreover, FIG. 6 is an action flowchart of the information processing apparatus.

An information processing apparatus 12C has an accelerator apparatus 6C instead of the accelerator apparatus 6A or 6B. The accelerator apparatus 6C is one or more FPGAs 17F. The FPGA 17F has a switch 50 for cooperation between arithmetic circuits 41P and a switch 51 for cooperation between the arithmetic circuits 41P and diagnostic circuits 41D.

In this embodiment, partial rewriting includes wiring rewriting instead of or in addition to the circuit rewriting and a further reduction of the rewriting time can be expected.

Specifically, after Yes in S205, the allocation decision unit 5 judges whether the circuit after the allocation in S203 matches the latest circuit of the FPGA 17F or not (S610).

If the judgment result of S610 is false (S610: No), the allocation decision unit 5 judges whether a resource where a failure has occurred is a diagnostic circuit 41D or not, on the basis of information from the available resource identification unit 9 (for example, information indicating the available resources and information indicating the failure resource) (S611).

If the judgment result of S611 is false (S611: No), the allocation decision unit 5 causes the rewriting control unit 15 to rewrite the processing circuit (S612) and then rewrite wiring (S613). In these steps S612 and S613, for example, circuit information including the content of rewriting of the processing circuit and the content of rewriting of the wiring may be input to the circuit rewriting unit 40 for the FPGA 17F. Also, in S613 after No in S611, the wiring for the switches 50 and 51 may be rewritten.

If the judgment result of S611 is true (S611: Yes), the allocation decision unit 5 causes the rewriting control unit 15 to rewrite the wiring (S613). In S613 after Yes in S611, the wiring of the switch 51 may be rewritten.

As a specific example of the circuit rewriting and the wiring rewriting, the following case is taken as an example: the case where two diagnostic circuits 41Da and 41Db exist with respect to one arithmetic circuit 41Pa, that is, processing circuits are triplicated for one node. In this case, a failure location may be one of three possible locations: the arithmetic circuit 41Pa, the diagnostic circuit 41Da, or the diagnostic circuit 41Db.

If a failure has occurred at the arithmetic circuit 41Pa, an arithmetic operation executed by the arithmetic circuit 41Pa needs to be allocated to any one of the diagnostic circuits 41Da and 41Db. Therefore, any one of the diagnostic circuits 41D needs to be rewritten as an arithmetic circuit 41P. In this case, the diagnostic circuit needs to be rewritten as an arithmetic circuit.

On the other hand, if a failure has occurred at the diagnostic circuit 41Da or 41Db, the diagnostic function of the diagnostic circuit 41D where the failure has occurred needs to be transferred to another diagnostic circuit 41D. However, the function itself does not change, so that the situation can be handled by changing only input/output to/from the diagnostic circuit 41D. Specifically, for example, if the failure has occurred at the diagnostic circuit 41Da, wiring linked to the input/output of the diagnostic circuit 41Da should only be required to be connected to the input/output of the other diagnostic circuit 41D.

Whether a failure has occurred at the diagnostic circuit 41D or not is judged as described above; and if the failure has occurred at the diagnostic circuit 41D, it is only necessary to rewrite the wiring. Incidentally, the configuration of the FPGA 17F illustrated in FIG. 5 and the action flowchart illustrated in FIG. 6 may be applied to the second embodiment.

The above description of the first to third embodiments can be summarized, for example, as described below. The following summary may include an supplementary explanation of at least one embodiment or an explanation of variations.

Figure 7:
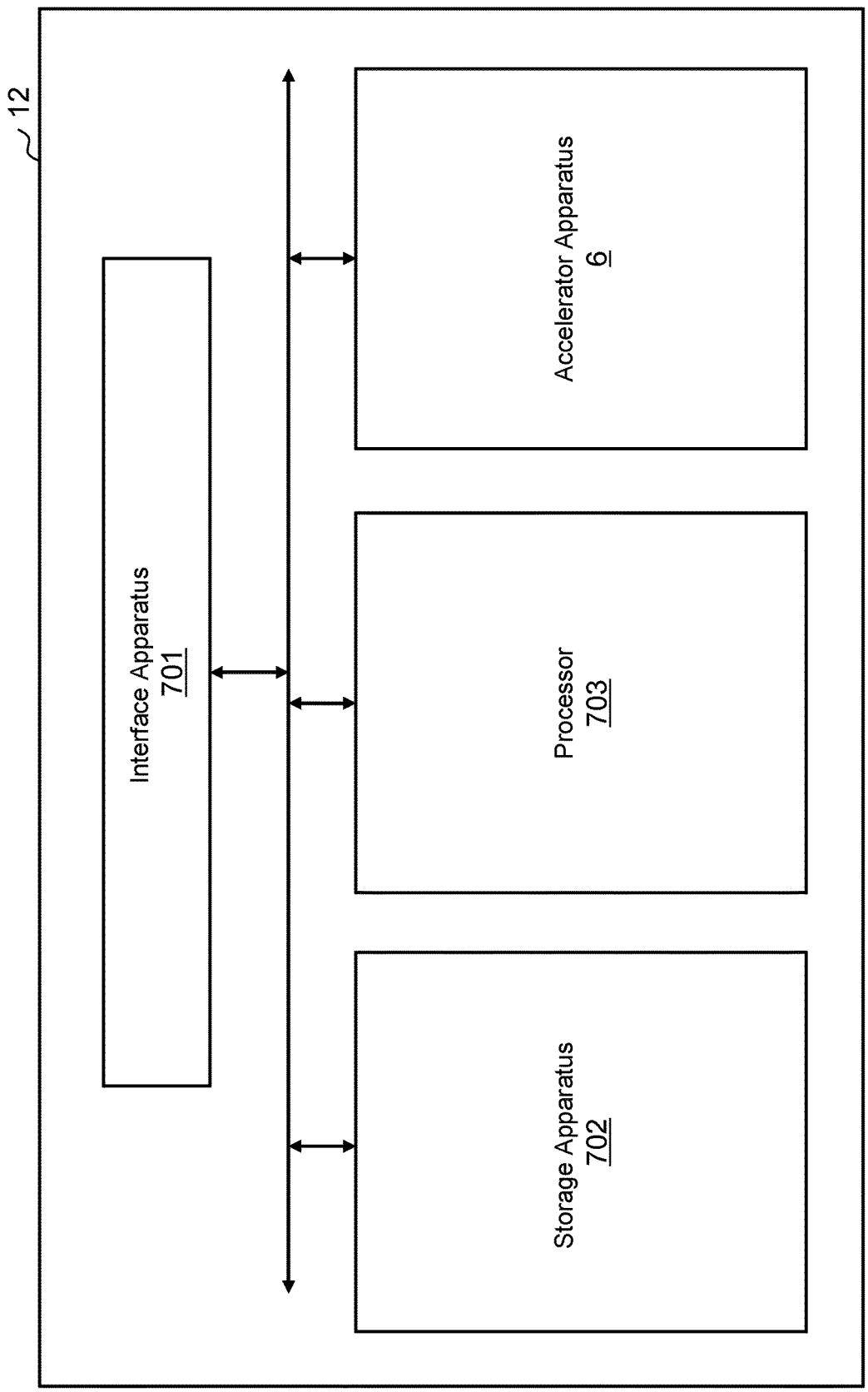
FIG. 7 is a hardware configuration diagram of the information processing apparatus.

The information processing apparatus 12 is designed to cause the accelerator apparatus 6 to perform an arithmetic operation by using an arithmetic operation target which is used for the arithmetic operation of input information and which outputs information. The information processing apparatus 12 includes, for example, as illustrated in FIG. 7, the interface apparatus 701, the storage apparatus 702, the accelerator apparatus 6, and the processor 703 which is connected to them. The hardware resource information 8 (for example, information indicating a plurality of processing circuits which the accelerator apparatus 6 has) and the learned neural network 1 (one example of the machine learning model with the graph structure) may be input via the interface apparatus 701. Moreover, the input information (for example, images captured by a camera) of the learned neural network 1 may be input via the interface apparatus 701. Furthermore, the reliability information 11 (for example, information indicating the calculated reliability) may be output via the interface apparatus 701. The information processing apparatus 12 may be so-called edge device or a server which communicates with a client like the edge device. If the information processing apparatus 12 is a server, it may be a server as a physical computer system or a server as a logical computer system (for example, a cloud computing service) based on a physical computer system (for example, a cloud infrastructure including a plurality of kinds of physical computing resources). Moreover, the accelerator apparatus 6 may be mounted in the information processing apparatus 12 or may be connected to the information processing apparatus 12 in a communicable manner. Furthermore, the accelerator apparatus 6 may be one or a plurality of hardware accelerators 17 or may be an apparatus as a package equipped with one or a plurality of hardware accelerators 17. Furthermore, the storage apparatus 702 may store at least part of the hardware resource information 8, the learned neural network 1, the failure influence degree 3, the reliability information 11, the allocation result information, the diagnostic information, and the diagnostic node information described earlier. As the processor 703 executes a computer program, at least one function of the influence degree calculation unit 2, the priority decision unit 4, the allocation decision unit 5, the reliability judgment unit 10, the diagnostic information collection unit 7, the available resource identification unit 9, the arithmetic operation control unit 14, and the rewriting control unit 15 may be implemented.

The information processing apparatus 12 includes the allocation decision unit 5 and the reliability judgment unit 10. Every time information regarding which the arithmetic operation target (the learned neural network 1 in the aforementioned example) is used, the following are performed:

Regarding each of a plurality of arithmetic operation elements (for example, a plurality of nodes) of the arithmetic operation target, the allocation decision unit 5 decides whether to allocate one or more diagnostic circuits, which are available processing circuits for accuracy diagnosis of the arithmetic operation, other than an arithmetic circuit which is an available processing circuit for the arithmetic operation, from the plurality of processing circuits of the accelerator apparatus 6 to the relevant arithmetic operation element on the basis of the failure influence degree that is a degree of influence by the accuracy of the arithmetic operation result of the relevant arithmetic operation element on the accuracy of output information of the arithmetic operation target. Incidentally, the "processing circuit" is, for example, a core 21 or a processing circuit 41. The "arithmetic circuit" is a processing circuit to which the arithmetic operation function is allocated. The "diagnostic circuit" is a circuit to which the diagnostic function is allocated.

The reliability judgment unit 10 calculates the reliability of the information processing apparatus 12 used to judge whether or not to continue the action(s) of the information processing apparatus 12 (for example, the aforementioned diagnostic coverage rate C) on the basis of the number of arithmetic operation elements in the arithmetic operation target, the number of arithmetic operation elements to which at least one diagnostic circuit is allocated, and the failure influence degree of the arithmetic operation elements.

Another expression of processing performed by the allocation decision unit 5 may be to control arithmetic redundancy "n" (n is an integer) of the relevant arithmetic operation element based on the failure influence degree of each arithmetic operation element. If n is equal to zero (n=0), no diagnostic circuit is allocated. In other words, the same number of diagnostic circuits as n is/are allocated. A processing circuit where a failure has occurred can be identified by comparing the arithmetic operation results regarding the arithmetic operation elements (n+1). For example, if any one of the arithmetic operation results is different from other two or more arithmetic operation results, it can be judged that the failure has occurred in the processing circuit which calculated that one arithmetic operation result.

Consequently, as the arithmetic redundancy of the relevant arithmetic operation element is controlled by the failure influence degree of that arithmetic operation element, the arithmetic operation element with a low failure influence degree may possibly be capable of maintaining the reliability to be equal to or more than a constant value even if no diagnostic circuit is allocated. Therefore, the reliability and the action continuity of the information processing apparatus 12 can be balanced so that the accelerator apparatus 6 will not become large-sized.

Incidentally, in the aforementioned embodiments, the reliability judgment unit 10 judges whether the calculated reliability is equal to or more than a constant value, and then controls to perform the action continuation or the action stop depending on the result of the above-mentioned judgment; however, the judgment on whether the calculated reliability is equal to or more than the constant value or not and the control of whether the action continuation or the action stop depending on the result of the judgment may be performed outside the information processing apparatus 12 (for example, by the user's manual operation or by a host system). For example, the information processing apparatus 12 may be an apparatus for performing automatic driving control of a vehicle or an apparatus connected to a host system for performing the automatic driving control. For example, if the reliability is equal to or more than a first value (an example of the aforementioned constant value) and is less than a second value, the reliability judgment unit 10 may change its target, which is part of the target of the automatic operation performed when the reliability is equal to or more than the second value, to a manual operation target. The interface apparatus 701 may be connected with a display device and the reliability judgment unit 10 may display, on the display device, the reliability indicated by the reliability information 11 or may display, on the display device, the content of the automatic operation according to the calculated reliability.

The allocation decision unit 5 may allocate one or more available processing circuits, including at least an arithmetic circuit(s), to an arithmetic operation element(s) in a sequential order of arithmetic operation elements based on the height of the failure influence degree of the arithmetic operation elements. Consequently, a limited number of available processing circuits can be efficiently allocated based on the height of the failure influence degree of the arithmetic operation elements.

If it is decided to continue the action(s) of the information processing apparatus 12, the following may be performed with respect to each of the plurality of arithmetic operation elements. Consequently, the processing circuits can be allocated to the arithmetic operation elements according to the latest status of the accelerator apparatus 6 (in which processing circuit a failure has occurred).

Regarding each of the plurality of arithmetic operation elements, processing of the relevant arithmetic operation element by each of one or more processing circuits allocated to the relevant arithmetic operation element.

Whether or not a failure has occurred at at least one of an arithmetic circuit and one or more diagnostic circuits is judged from processing results of the arithmetic circuit and the one or more diagnostic circuits with respect to each arithmetic operation element to which the one or more diagnostic circuits are allocated.

The information processing apparatus 12 may further include the rewriting control unit 15 and at least one of one or a plurality of hardware accelerators may be an FPGA 17F (one example of a circuit-rewritable hardware accelerator (for example, a PGA (Programmable Gate Array))). If the current circuit configuration (for example, the number of diagnostic circuits) of the FPGA 17F is different from a circuit configuration (for example, the number of diagnostic circuits) as a result of the allocation by the allocation decision unit 5, the rewriting control unit 15 may issue an instruction to the FPGA 17F to perform circuit rewriting regarding the difference between the circuit configurations (at least either rewriting of the processing circuit itself or rewriting of wiring between the processing circuits). In response to this instruction, the circuit rewriting by the FPGA 17 is executed. After that, it becomes possible to continue the action(s) (for example, S206 and subsequent steps). Consequently, it is possible to minimize the time required for the circuit rewriting and thereby reduce any delay in the information processing as caused by waiting for the completion of the circuit rewriting.

Specifically, for example, at least one of the following may be performed. Consequently, optimization of time required for the circuit rewriting can be expected depending on whether the processing circuit where a failure has occurred is an arithmetic circuit or a diagnostic circuit.

If the failure has occurred at the arithmetic circuit, the rewriting control unit 15 issues an instruction to the FPGA 17F to rewrite any one of the diagnostic circuits to an arithmetic circuit (because the number of arithmetic circuits is maintained as the allocation result although the number of arithmetic circuits has decreased according to the current circuit configuration of the FPGA 17F) and to rewrite wiring between the processing circuits.

If the failure has occurred at the diagnostic circuit, the rewriting control unit 15 issues an instruction to the circuit-rewritable hardware accelerator to rewrite the wiring between the processing circuits and does not issue an instruction to the circuit-rewritable hardware accelerator to rewrite the processing circuit.

One example of the arithmetic operation target may be a learned neural network 1. The neural network 1 may include, for example, an input layer (a plurality of input nodes), an intermediate layer (a plurality of intermediate nodes), an output layer (a plurality of output nodes), a plurality of weight parameters, and a plurality of bias parameters. The influence degree calculation unit 2 may calculate a degree of influence by each intermediate node on each output node on the basis of the weight parameters or the bias parameters. Information indicating the calculation result may be the failure influence degree 3.

Alternatively, a different type of machine learning model with a graph structure (for example, a decision tree) having a plurality of nodes may be adopted instead of the neural network 1. Moreover, the failure influence degree 3 indicating the failure influence degree of each arithmetic operation element may be information which is input from outside instead of being generated by the influence degree calculation unit 2.

REFERENCE SIGNS LIST

1: learned neural network
2: influence degree calculation unit
3: failure influence degree
4: priority decision unit
5: allocation decision unit
6: accelerator apparatus
7: diagnostic information collection unit
8: hardware resource information
9: available resource identification unit
10: reliability judgment unit
11: reliability information
12: information processing apparatus
17: hardware accelerator

The invention claimed is:

1. An information processing apparatus for causing an accelerator apparatus to perform an arithmetic operation by using an arithmetic operation target which is used for the arithmetic operation of input information and which outputs information, the information processing apparatus comprising:

an allocation decision unit; and
a reliability judgment unit,
wherein the accelerator apparatus has one or a plurality of hardware accelerators with a plurality of processing circuits; and
wherein every time the information for which the arithmetic operation target is used is input, the following are performed:
the allocation decision unit decides, regarding each of a plurality of arithmetic operation elements of the arithmetic operation target, whether to allocate one or more diagnostic circuits, which are available processing circuits for an accuracy diagnosis of the arithmetic operation, other than an arithmetic circuit which is an available processing circuit for the arithmetic operation, from the plurality of processing circuits to the respective arithmetic operation element on the basis of a failure influence degree that is a degree of influence by accuracy of an arithmetic operation result of the respective arithmetic operation element on accuracy of output information of the arithmetic operation target; and the reliability judgment unit calculates reliability of the information processing apparatus that is used to judge whether or not to continue an action of the information processing apparatus, on the basis of the number of arithmetic operation elements of the arithmetic operation target, the number of arithmetic operation elements to which at least one diagnostic circuit is allocated, and the respective failure influence degree of the arithmetic operation elements.

2. The information processing apparatus according to claim 1, wherein the allocation decision unit allocates one or more available processing circuits including at least an arithmetic circuit to an arithmetic operation element(s) in a sequential order of the respective arithmetic operation elements based on a height of the respective failure influence degree of the arithmetic operation elements.

3. The information processing apparatus according to claim 1, wherein when it is decided to continue the action of the information processing apparatus, the following are performed:

regarding each of the plurality of arithmetic operation elements, processing of the respective arithmetic operation element by each of one or more processing circuits allocated to the respective arithmetic operation element; and regarding each arithmetic operation element to which one or more diagnostic circuits are allocated, judgment on whether or not a failure has occurred at at least one of an arithmetic circuit and one or more diagnostic circuits, based on processing results of the arithmetic circuit and the one or more diagnostic circuits; and wherein the available processing circuit is a processing circuit which is not judged that the failure has occurred.

4. The information processing apparatus according to claim 1, further comprising a rewriting control unit, wherein at least one of the one or plurality of hardware accelerators is a circuit-rewritable hardware accelerator; and wherein when a current circuit configuration of the circuit-rewritable hardware accelerator is different from a circuit configuration as an allocation result by the allocation decision unit, the rewriting control unit issues an instruction to the circuit-rewritable hardware accelerator to perform circuit rewriting about the difference between the circuit configurations.

5. The information processing apparatus according to claim 4, wherein when the current circuit configuration of the circuit-rewritable hardware accelerator is different from the circuit configuration as the allocation result by the allocation decision unit, the rewriting control unit:

issues an instruction to the circuit-rewritable hardware accelerator to rewrite any one of the diagnostic circuits to the arithmetic circuit and rewrite wiring between the processing circuits if a failure has occurred at the arithmetic circuit; and issues an instruction to the circuit-rewritable hardware accelerator to rewrite the wiring between the processing circuits and does not issue an instruction to the circuit-rewritable hardware accelerator to rewrite the processing circuits if a failure has occurred at one of the diagnostic circuits.

6. The information processing apparatus according to claim 1, wherein the arithmetic operation target is a machine learning model with a graph structure which has a plurality of nodes; and wherein the plurality of arithmetic operation elements are the plurality of nodes.

7. The information processing apparatus according to claim 6, wherein the machine learning model with the graph structure is a neural network.

8. An information processing method for causing an accelerator apparatus to perform an arithmetic operation by using an arithmetic operation target which is used for the arithmetic operation of input information and which outputs information, wherein every time the information for which the arithmetic operation target is used is input, (A) a computer decides, regarding each of a plurality of arithmetic operation elements of the arithmetic operation target, whether to allocate one or more diagnostic circuits, which are available processing circuits for an accuracy diagnosis of the arithmetic operation, other than an arithmetic circuit which is an available processing circuit for the arithmetic operation, from a plurality of processing circuits of one or a plurality of hardware accelerators, which the accelerator apparatus has, to the respective arithmetic operation element on the basis of a failure influence degree that is a degree of influence by accuracy of an arithmetic operation result of the respective arithmetic operation element on accuracy of output information of the arithmetic operation target; and (B) the computer calculates reliability of information processing that is used to judge whether or not to continue the information processing on the basis of the number of arithmetic operation elements of the arithmetic operation target, the number of arithmetic operation elements to which at least one diagnostic circuit is allocated, and the respective failure influence degree of the arithmetic operation elements.

9. The information processing method according to claim 8, wherein in (A), the computer allocates one or more available processing circuits including at least an arithmetic circuit to an arithmetic operation element(s) in a sequential order of the respective arithmetic operation elements based on a height of the respective failure influence degree of the arithmetic operation elements.

10. The information processing method according to claim 8, wherein when the reliability calculated in (B) is equal to or more than a constant value, regarding each of the plurality of arithmetic operation elements, processing of the respective arithmetic operation element is performed by each of one or more processing circuits allocated to the respective arithmetic operation element; and regarding each arithmetic operation element to which one or more diagnostic circuits are allocated, the computer judges whether or not a failure has occurred at at least one of an arithmetic circuit and one or more diagnostic circuits, based on processing results of the arithmetic circuit and the one or more diagnostic circuits; and wherein the available processing circuit is a processing circuit which is not judged that the failure has occurred.

11. The information processing method according to claim 8, wherein at least one of the one or plurality of hardware accelerators is a circuit-rewritable hardware accelerator; and wherein when a current circuit configuration of the circuit-rewritable hardware accelerator is different from a circuit configuration as an allocation result in (A), the computer issues an instruction to the circuit-rewritable hardware accelerator to perform circuit rewriting about the difference between the circuit configurations.

12. The information processing method according to claim 8, wherein the arithmetic operation target is a machine learning model with a graph structure which has a plurality of nodes; and wherein the plurality of arithmetic operation elements are the plurality of nodes.

* * * * *